United States Patent
Bowen

(10) Patent No.: US 7,258,187 B2
(45) Date of Patent: Aug. 21, 2007

(54) TORQUE VECTORING AXLE

(75) Inventor: Thomas C. Bowen, Rochester Hills, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 489 days.

(21) Appl. No.: 10/846,859

(22) Filed: May 14, 2004

(65) Prior Publication Data

US 2005/0252707 A1    Nov. 17, 2005

(51) Int. Cl.
*B60K 17/344* (2006.01)
*F16H 48/06* (2006.01)

(52) U.S. Cl. .............. 180/248; 180/245; 180/246; 180/249; 475/248; 475/249

(58) Field of Classification Search .............. 475/5, 475/6, 198, 207, 221, 248, 249; 180/233, 180/245, 246, 248, 249
See application file for complete search history.

(56) References Cited

U.S. PATENT DOCUMENTS

| | | | |
|---|---|---|---|
| 4,691,593 A | 9/1987 | Mueller | |
| 4,757,728 A | 7/1988 | Pitsch | |
| 4,763,747 A | 8/1988 | Muller | |
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |
| 5,662,543 A * | 9/1997 | Forsyth | 475/198 |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 5,989,146 A * | 11/1999 | Brown et al. | 475/207 |
| 6,120,407 A | 9/2000 | Mimura | |
| 6,378,677 B1 | 4/2002 | Kuroda et al. | |
| 6,394,246 B1 | 5/2002 | Gassmann et al. | |
| 6,520,880 B1 | 2/2003 | Fukushima et al. | |
| 6,533,090 B2 | 3/2003 | Osborn et al. | |
| 6,616,566 B2 | 9/2003 | Gorlich | |
| 6,645,108 B1 | 11/2003 | Gradu | |
| 6,962,227 B1 * | 11/2005 | Kirkwood | 180/245 |
| 7,080,707 B2 * | 7/2006 | Kirkwood | 180/245 |

(Continued)

FOREIGN PATENT DOCUMENTS

WO    WO 02/09966 A1    2/2002

*Primary Examiner*—Lesley D. Morris
*Assistant Examiner*—Daniel Yeagley
(74) *Attorney, Agent, or Firm*—Harness, Dickey & Pierce, P.L.C.

(57) ABSTRACT

A drive axle assembly includes a pair of axleshafts connected to a pair of wheels, and a drive mechanism for selectively coupling a driven input shaft to one or both of the axleshafts. The drive mechanism includes first and second drive units that can be selectively engaged to control the magnitude of the drive torque transferred and the relative rotary speed between the input shaft and the axleshafts. Each drive unit includes a planetary gearset disposed between the input shaft and its corresponding axleshaft, and a pair of mode clutches that may be activated to cause the planetary gearset to establish different speed ratio drive connections between the input shaft and the axleshaft. A control system including an electronic control unit (ECU) and sensors are provided to control actuation of the clutches so as to control the side-to-side traction characteristics of the drive axle assembly.

16 Claims, 5 Drawing Sheets

U.S. PATENT DOCUMENTS

2002/0177500 A1*  11/2002  Bowen ......................... 475/5
2005/0159264 A1*  7/2005   Puiu et al. .................. 475/198
2005/0176543 A1*  8/2005   Kirkwood et al. ............. 475/5
2005/0279558 A1*  12/2005  Kirkwood ................... 180/245

* cited by examiner

| DRIVE MODE | FIRST MODE CLUTCH | SECOND MODE CLUTCH | THIRD MODE CLUTCH | FOURTH MODE CLUTCH |
|---|---|---|---|---|
| 1ST | LOCKED | RELEASED | RELEASED | RELEASED |
| 2ND | RELEASED | LOCKED | RELEASED | RELEASED |
| 3RD | LOCKED | RELEASED | RELEASED | LOCKED |
| 4TH | LOCKED | RELEASED | LOCKED | RELEASED |
| 5TH | RELEASED | LOCKED | RELEASED | LOCKED |
| 6TH | RELEASED | RELEASED | LOCKED | RELEASED |
| 7TH | RELEASED | RELEASED | RELEASED | LOCKED |
| 8TH | RELEASED | LOCKED | LOCKED | RELEASED |
| 9TH | RELEASED | RELEASED | RELEASED | RELEASED |

FIG. 4

TORQUE VECTORING AXLE

FIELD OF THE INVENTION

The present invention relates generally to axle assemblies for use in motor vehicles and, more specifically, to an axle assembly equipped with a torque vectoring drive mechanism and an active yaw control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw and stability control system.

To achieve this objective, the drive axle assembly of the present invention includes a pair of axleshafts connected to a pair of wheels, and a drive mechanism that is operable to selectively couple a driven input shaft to one or both of the axleshafts. In particular, the drive mechanism includes first and second drive units that can be selectively engaged to control the magnitude of the drive torque transferred and the relative rotary speed between the input shaft and the axleshafts. Each drive unit includes a planetary gearset that is operably disposed between the input shaft and its corresponding axleshaft, and a pair of mode clutches that may be activated to cause the planetary gearset to establish different speed ratio drive connections between the input shaft and the axleshaft. Each mode clutch includes a multi-plate clutch pack and a power-operated actuator to control the engagement force applied to the clutch pack. A control system including an electronic control unit (ECU) and sensors are provided to control actuation of the clutches so as to control the side-to-side traction characteristics and the front-to-rear torque transfer characteristics of the drive axle assembly.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein:

FIG. 4 is a table listing the available operational drive modes established by the drive axle assembly of the present invention.

DETAILED DESCRIPTION OF THE PREFERRED EMBODIMENTS

Figure 1:
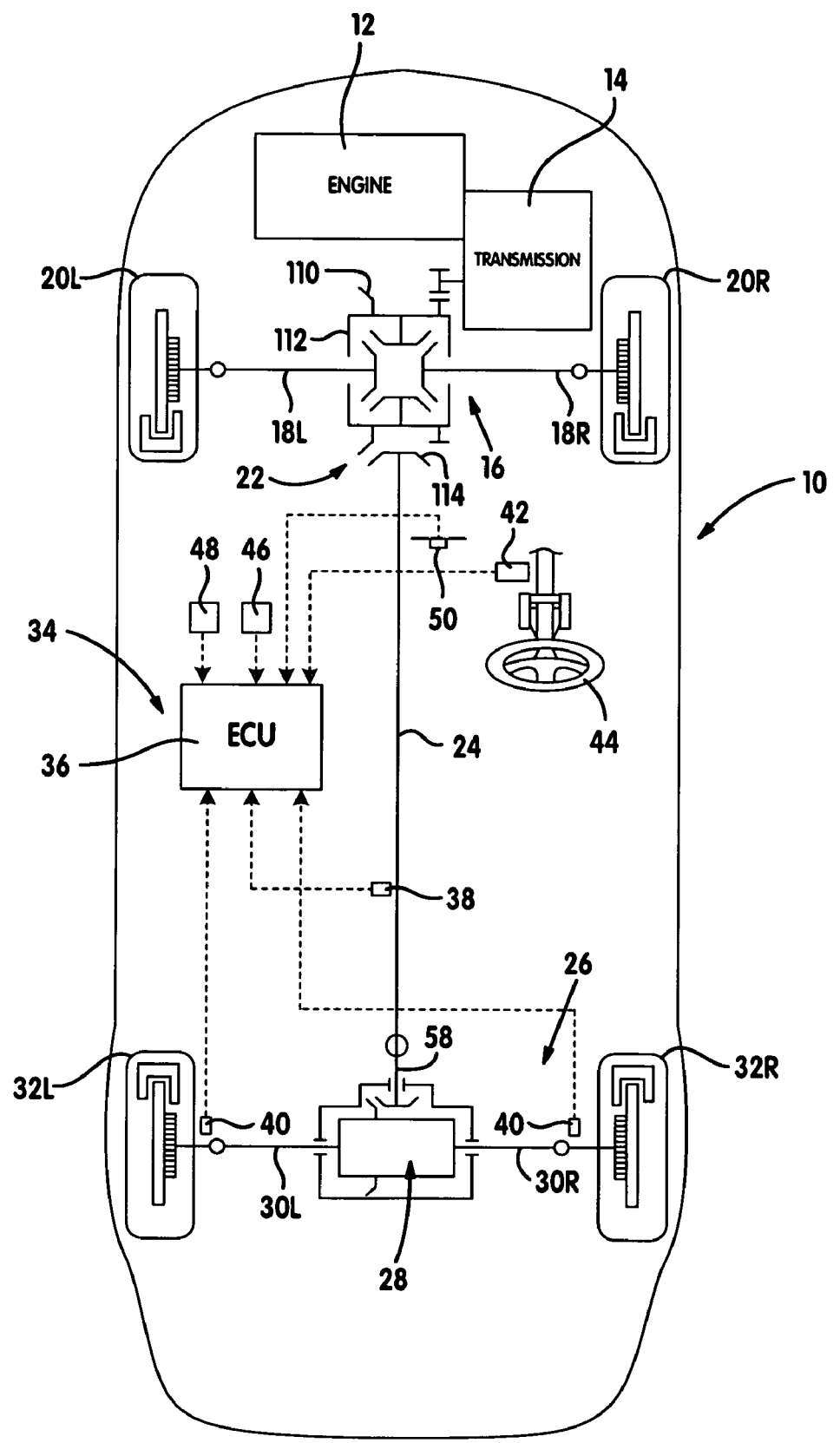
FIG. 1 is a diagrammatical illustration of a four-wheel drive motor vehicle equipped with the yaw and stability control system of the present invention.

Referring to FIG. 1, a four-wheel drive vehicle 10 includes an engine 12 horizontally mounted in a front portion of a vehicle body, a transmission 14 provided integrally with engine 12, a front differential 16 which connects transmission 14 to front axleshafts 18L and 18R for driving left and right front wheels 20L and 20R, a power transfer unit ("PTU") 22 which connects front differential 16 to a propshaft 24, and a rear axle assembly 26 having a drive mechanism 28 which connects propshaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R. When the transmission of drive torque is cut off to drive mechanism 28, vehicle 10 is brought into a front wheel drive (FWD) state in which only front wheels 20L and 20R are driven. In contrast, vehicle 10 can be brought into a four-wheel drive (4WD) state wherein drive torque is transmitted to front wheels 20L and 20R and rear wheels 32L and 32R. Further, in the 4WD state, rear drive mechanism 28 is capable of varying the magnitude of drive torque to one or both of left and right rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propshaft 24, a pair of rear wheel speed sensors 40 are operable to detect the individual rear wheel speed values based rotation of left and right axle shafts 30L and 30R, and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of left and right drive units 52L and 52R associated with drive mechanism 28 by utilizing a control strategy that is based on input signals from the various sensors and lock switch 50.

Rear axle assembly 26 includes an axle housing 56 within which left drive unit 52L and right drive unit 52R of drive mechanism 28 are located. As seen, an input pinion shaft 58 is connected to propshaft 24 and extends into and is rotatably supported by housing 56. Input shaft 58 includes a pinion gear 60 in constant mesh with a hypoid ring gear 62 that is fixed for rotation with a drive component, hereinafter referred to as drive case 64. Drive case 64 is supported for rotation within axle housing 56 about an axis common with that of axleshafts 30L and 30R. Left drive unit 52L is operably arranged to selectively transfer drive torque from drive case 64 to left axleshaft 30L. Likewise, right drive unit 52R is operably arranged to selectively transfer drive torque from drive case 64 to right axleshaft 30R. Since the left and right drive units are substantially mirror-imaged arrangements, the components of left drive unit 52L will initially be described in detail with it understood that the common components are identified using "L" and "R" suffixes to designate "left" and "right".

Figure 2:
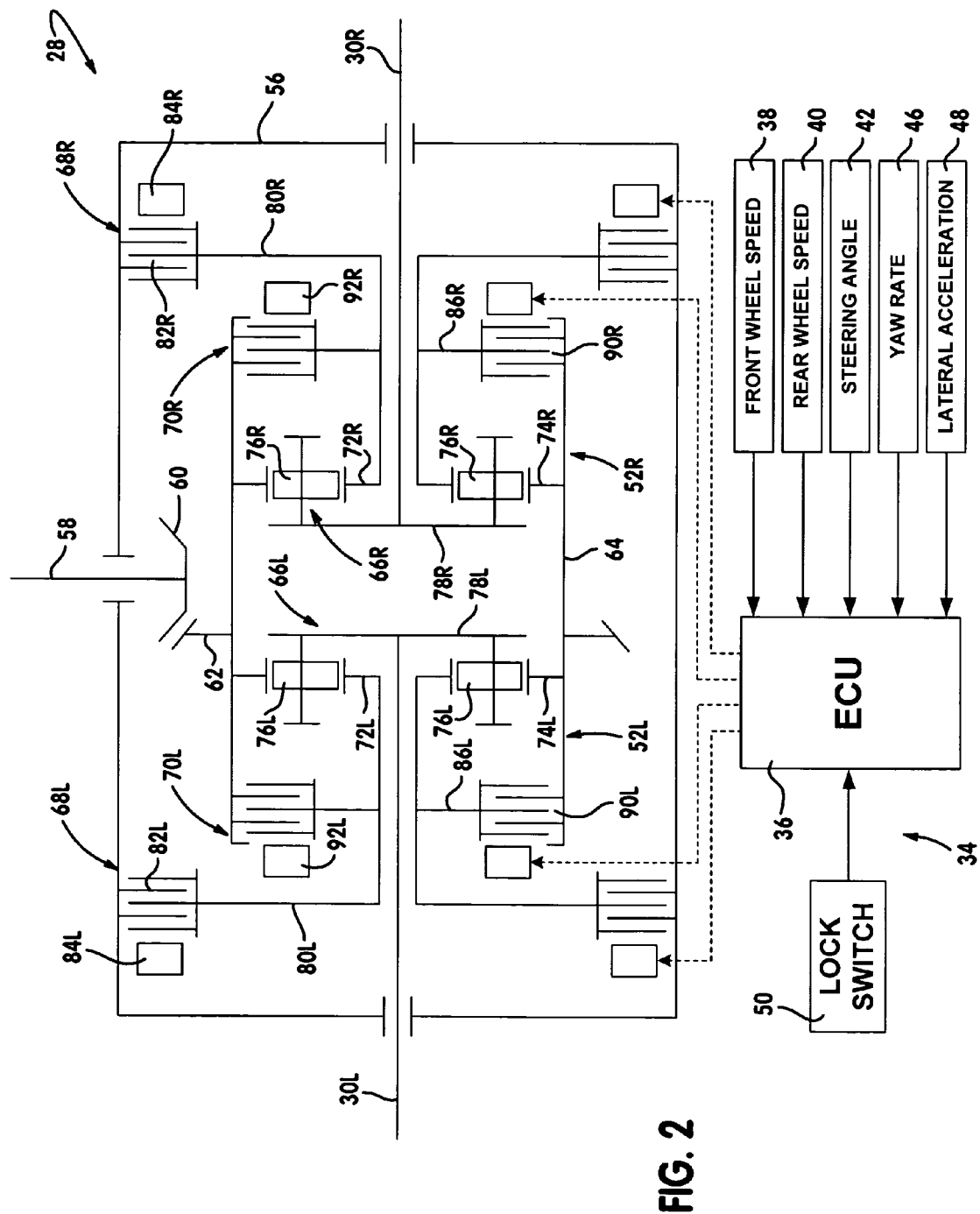
FIG. 2 is a schematic illustration of the drive axle assembly shown in FIG. 1 according to the present invention.

Referring to FIG. 2, left drive unit 52L is shown to generally include a planetary gearset 66L, a first mode clutch 68L, and a second mode clutch 70L. Planetary gearset 66L has a sun gear 72L, a ring gear 74L, and a plurality of planet gears 76L meshed therewith which are rotatably supported from a planet carrier 78L. As seen, ring gear 74L is fixed for rotation with drive case 64 so as to act as the input member of gearset 66L while planet carrier 78L is fixed for rotation with axleshaft 30L so as to act as the output member of gearset 66L.

First mode clutch 68L is operably arranged between sun gear 72L and housing 56 and acts as a brake device. First mode clutch 68L includes a clutch hub 80L fixed for rotation with sun gear 72L, a multi-plate clutch pack 82L disposed between hub 80L and housing 56, and a power-operated actuator 84L. First mode clutch 68L is operable in a first or "released" mode so as to permit unrestricted rotation of sun gear 72L such that no drive torque is transferred from drive case 64 through gearset 66L to left axleshaft 30L. In contrast, first mode clutch 68L is also operable in a second or "locked" mode for inhibiting rotation of sun gear 72L such that left axleshaft 30L is underdriven relative to drive case 64 at a reduced speed ratio that is established by the meshed gear components of planetary gearset 66L. First mode clutch 68L is shifted between its released and locked modes via actuation of power-operated actuator 84L in response to control signals from ECU 36. In particular, first mode clutch 68L is operable in its released mode when power-operated actuator 84L applies a minimum clutch engagement force on clutch pack 82L and is further operable in its locked mode when actuator 84L applies a maximum clutch engagement force on clutch pack 82L.

Second mode clutch 70L is shown to be operably arranged between sun gear 72L and drive case 64. Second mode clutch 70L includes a clutch hub 86L fixed for rotation with sun gear 72L, a multi-plate clutch pack 90L operably disposed between hub 86L and drive case 64, and a power-operated actuator 92L. Second mode clutch 70L is operable in a first or "released" mode to permit unrestricted rotation of sun gear 72L relative to drive case 64 such that no drive torque is transferred from drive case 64 through planetary gearset 66L to left axleshaft 30L. In contrast, second mode clutch 70L is also operable in a second or "locked" mode for inhibiting relative rotation between sun gear 72L and drive case 64, thereby locking planetary gearset 66L and establishing a direct speed ratio drive connection between drive case 64 and left axleshaft 30L. Second mode clutch 70L is also shifted between its released and locked modes via actuation of power-operated actuator 92L in response to control signals from ECU 36. Specifically, second mode clutch 70L is operable in its released mode when power-operated actuator 92L applies a minimum clutch engagement force on clutch pack 90L and is further operable in its locked mode when actuator 92L applies a maximum clutch engagement force on clutch pack 90L.

Referring still to FIG. 2, the components of right drive unit 52R are shown to basically be identical to those of left drive unit 52L and include a planetary gearset 66R, a third mode clutch 68R, and a fourth mode clutch 70R. Gearset 66R includes a ring gear 74R driven by drive case 64, a sun gear 72R, planet gears 76R meshed therewith which are supported by a planet carrier 78R that is fixed for rotation with right axleshaft 30R. Third mode clutch 68R includes a hub 80R fixed for rotation with sun gear 72R, a multi-plate clutch pack 82R, and a power-operated actuator 84R. Third mode clutch 68R is operable in a first or "released" mode to permit unrestricted rotation of sun gear 72R relative to housing 56 such that no drive torque is transferred from drive case 64 to right axleshaft 30R. In contrast, third mode clutch 68R is also operable in a second or "locked" mode for inhibiting rotation of sun gear 72R such that right axleshaft 30R is underdriven relative to drive case 64 at a reduced speed ratio established by gearset 66R. Power-operated actuator 84R is operable to shift third mode clutch 68R between its released and locked modes in response to control signals from ECU 36. In particular, third mode clutch 68R is operable in its released mode when clutch actuator 84R applies a minimum clutch engagement force on clutch pack 82R and is further operable in its locked mode when clutch actuator 84R applies a maximum clutch engagement force on clutch pack 82R.

Fourth mode clutch 70R is operably arranged between sun gear 72R and drive case 64 and includes a hub 86R driven by sun gear 72R, a clutch pack 90R disposed between hub 86R and drive case 64, and a power-operated actuator 92R. Fourth mode clutch 70R is operable in a first or "released" mode to permit unrestricted rotation of sun gear 72R relative to drive case 64 such that no drive torque is transmitted from drive case 64 to right axleshaft 30R through planetary gearset 66R. In contrast, fourth mode clutch 70R is operable in a second or "locked" mode for inhibiting relative rotation between sun gear 72R and drive case 64, thereby locking gearset 66R and establishing a direct speed ratio drive connection between drive case 64 and right axleshaft 30R. Fourth mode clutch 70R is also shifted between its released and locked modes via actuation of power-operated actuator 92R in response to control signals from ECU 36. Specifically, fourth mode clutch 70R is operable in its released mode when power-operated actuator 92R applies a minimum clutch engagement force on clutch pack 90R and is further operable in its locked mode when actuator 92R applies a maximum clutch engagement force on clutch pack 90R.

Figure 3:
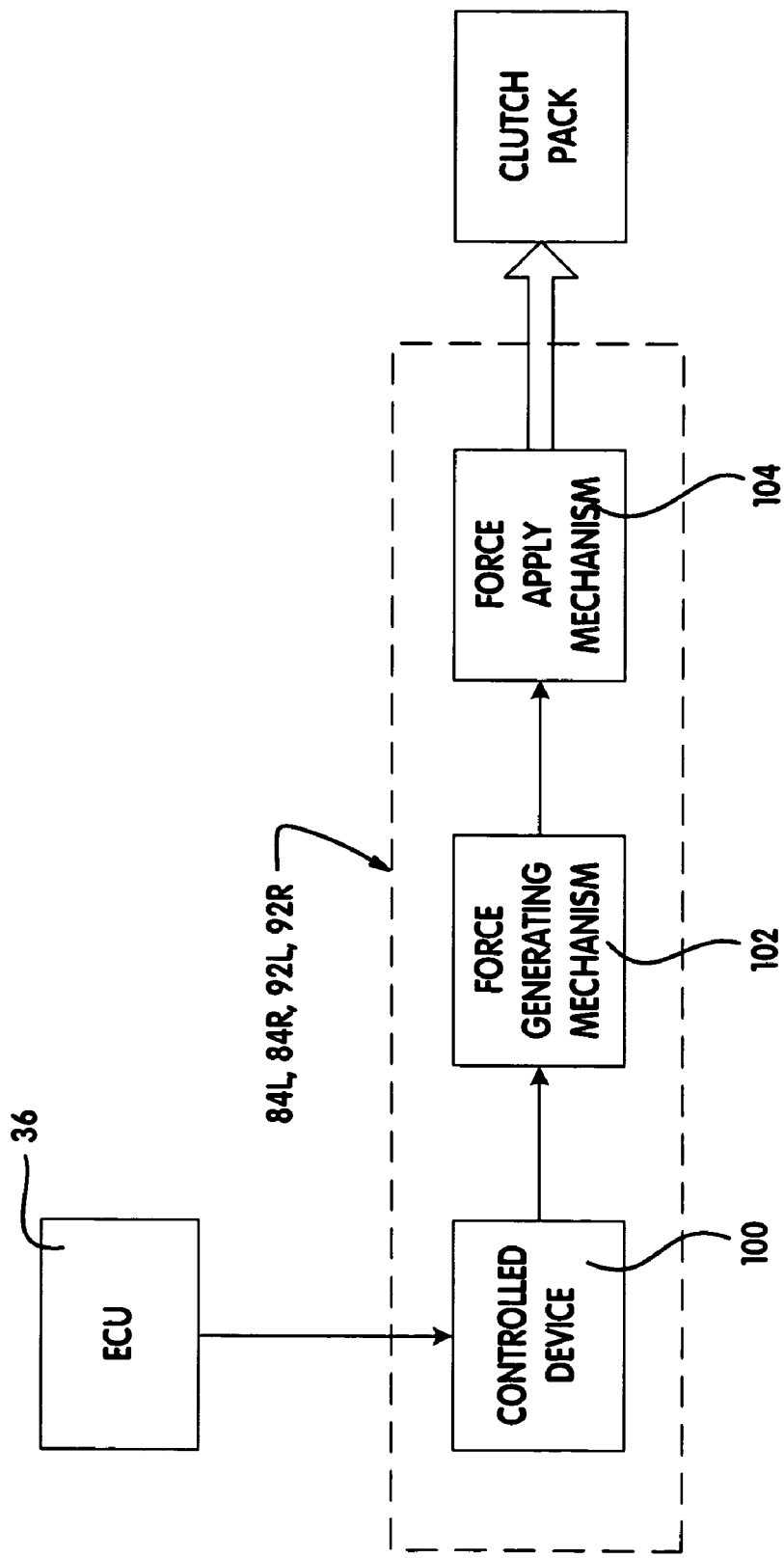
FIG. 3 is a diagrammatical illustration of the power-operated actuators associated with the left and right drive units in the drive axle assembly of the present invention.
Figure 5:
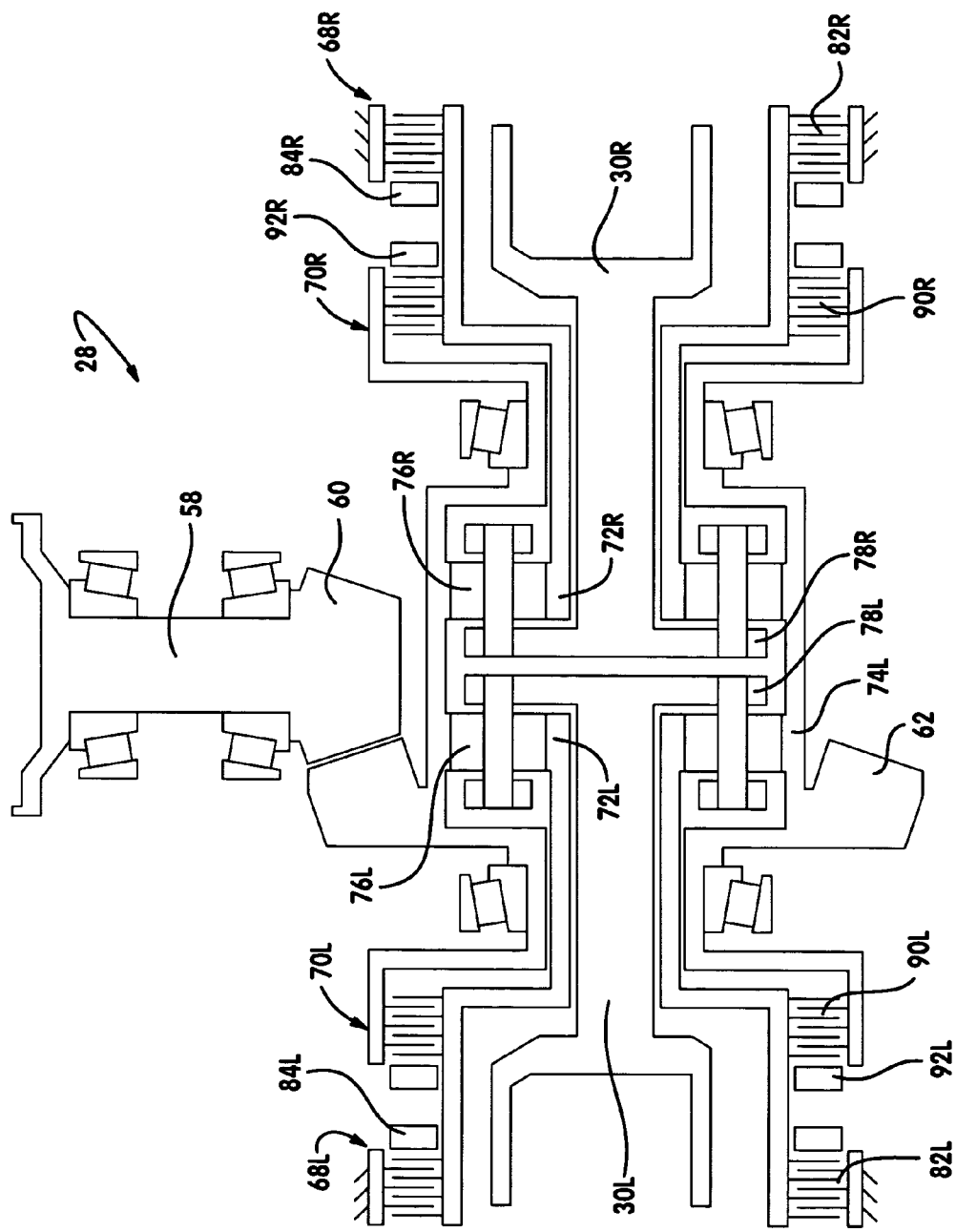
FIG. 5 is a sectional view of a version of the drive axle assembly schematically shown on FIG. 2.

As seen, power-operated actuators 84L, 84R, 92L and 92R are shown in block format to cumulatively represent the components required to accept a control signal from ECU 36 and generate a clutch engagement force to be applied to its corresponding clutch pack. To this end, FIG. 3 diagrammatically illustrates the basic components associated with such power-operated clutch actuators. Specifically, each power-operated actuator includes a controlled device 100, a force generating mechanism 102, and a force apply mechanism 104. In electro-mechanical systems, controlled device 100 would represent such components as, for example, an electric motor or an electromagnetic solenoid assembly capable of receiving an electric control signal from ECU 36. The output of controlled device 100 would drive a force generating mechanism 102 comprised of, for example, a ball ramp, a ball screw, a leadscrew, a pivotal lever arm, cam plates, etc., capable of converting the output into a clutch engagement force. Finally, force apply mechanism 104 functions to transmit and exert the clutch engagement force generated by force generating mechanism 102 onto the clutch pack and can include, for example, an apply plate or a thrust plate. If a hydra-mechanical system is used, controlled device 100 would be a flow or pressure control valve operable for delivering pressurized fluid from a fluid source to a piston chamber. A piston disposed for movement in the piston chamber would act as force generating mechanism 102. Preferably, controlled device 100 is also capable of receiving variable electric control signals from ECU 36 for permitting modulation of the magnitude of the clutch engagement force generated and applied to the clutch packs so as to permit "adaptive" control of the mode clutches.

A feature of the present invention is the ability of drive mechanism 28 to provide both left-right and front-rear torque transfer control. In this regard, it is desired to have the driven component of drive mechanism 28 driven at an increased speed (i.e., overdriven) relative to a driven component of PTU 22. As best seen from FIG. 1, PTU 22 includes a hypoid ring gear 110 driven by a carrier 112 of front differential 16 and a pinion gear 114 fixed for rotation with propshaft 24. Front differential 16 also includes a conventional bevel gearset for transferring drive torque from carrier 112 to front axleshafts 18L and 18R while permitting speed differentiation therebetween. To provide this overdrive feature, it is contemplated that ring gear 110 and pinion gear 114 have a higher ratio than that of ring gear 62 and pinion gear 60. According to a non-limiting example, a front ratio of about 3.38 is established by ring gear 110 having 44 teeth that are meshed with pinion gear 114 having 13 teeth. In contrast, a rear ratio of about 2.93 is established by pinion gear 60 having 15 teeth meshed with rear hypoid ring gear 62 having 44 teeth. This exemplary front/rear ratio difference of 3.38/2.93 means that rear ring gear 62 is driven approximately 15% faster than front ring gear 110.

In addition to the use of different drive ratios between the front and rear drivelines of vehicle 10, the speed reduction provided by each of planetary gearsets 66L and 66R is selected to permit additional control over the torque transfer characteristics. According to a non-limiting example, it is proposed that ring gears 74L, 74R each have 92 teeth, planet gears 76L, 76R each have 36 teeth, and sun gears 72L, 72R each have 28 teeth such that each planetary gearset is capable of providing an overall reduction between the rotary speed of drive case 64 and axleshafts 30L, 30R of about 1.304. As such, engagement of both of second mode clutch 70L and fourth mode clutch 70R results in a 4WD mode wherein rear wheels 32L, 32R are driven about 15% faster than front wheels 20L, 20R. In contrast, engagement of both first mode clutch 68L and third mode clutch 68R results in a 4WD mode wherein rear wheels 32L, 32R are driven about 15% slower than front wheels 20L, 20R.

In accordance with the arrangement shown, drive mechanism 28 is operable in coordination with yaw control system 34 to establish at a least nine distinct operative modes for controlling the transfer of drive torque from input shaft 58 to axleshafts 30L and 30R. To this end, each of the nine distinct operative modes will now be described, with the table provided in FIG. 4 depicting the operational status of each of the mode clutches required to establish each drive mode.

A first operative drive mode is established when first mode clutch 68L is in its locked mode and each of the second, third and fourth mode clutches are in their released mode. As such, right drive unit 52R is disconnected such that no drive torque is delivered from drive case 64 to right axleshaft 30R while left drive unit 52L causes left axleshaft 30L to be underdriven relative to drive case 64. When this drive mode is selected, right rear wheel 32R is free to rotate relative to left rear wheel 32L which, in turn, is underdriven in relation to drive case 64.

A second operative drive mode is established with second mode clutch 70L in its locked state and all of the other three mode clutches in their released modes. In this second drive mode, left drive unit 52L causes left axleshaft 30L to be commonly driven at a direct speed ratio with drive case 64 while right drive unit 52R is disconnected such that no drive torque is transmitted from drive case 64 to right axleshaft 30R. This second drive mode is similar to the first drive mode except that left rear wheel 32L is being directly driven instead of underdriven relative to the rotary speed of drive case 64.

A third operative drive mode is established when first mode clutch 68L and fourth mode clutch 70R are shifted into their locked modes while second mode clutch 70L and third mode clutch 68R are shifted into their released modes. In this third drive mode, left drive unit 52L functions to underdrive left axleshaft 30L relative to drive case 64 while right drive unit 52R couples right axleshaft 30R for common rotation with drive case 64. Thus, unequal drive torque is being delivered to rear wheels 32L and 32R with left rear wheel 32L being underdriven relative to right rear wheel 32R.

To establish the fourth operative drive mode, first mode clutch 68L and third mode clutch 68R are shifted into their locked modes while second mode clutch 70L and fourth mode clutch 70R are shifted into their released modes. In this fourth drive mode, both drive units are engaged such that each gearset 66L and 66R functions to underdrive its corresponding axleshaft 30L and 30R relative to the rotary speed of drive case 64. In essence, this mode establishes a locked four-wheel underdrive mode since rear wheels 32L and 32R are underdriven relative to front wheels 20L and 20R. In particular, rear wheels 32L and 32R are driven about 15% slower than front wheels 20L and 20R.

To establish the fifth operative drive mode, second mode clutch 70L and fourth mode clutch 70R are shifted into their locked modes while first and third mode clutches 68L and 68R are shifted into their released modes. In this fifth drive mode, left drive unit 52L couples left axleshaft 30L for common rotation with drive case 64 while right drive unit 52R similarly couples right axleshaft 30R for common rotation with drive case 64. As such, a locked four-wheel direct drive mode is established since rear wheels 32L and 32R are commonly driven. However, in this mode, rear wheels 30L and 30R are driven up to 15% faster than front wheels 20L and 20R.

The sixth operative drive mode is established with third mode clutch 68R shifted into its locked mode while all of the other three mode clutches are shifted into their released modes. As such, left drive unit 52L is disconnected such that no drive torque is transferred to left axleshaft 30L while right drive unit 52R functions to underdrive axleshaft 30R relative to drive case 64.

The seventh operative drive mode is established when fourth mode clutch 70R is locked and all of the other mode clutches are released. As such, right drive unit 52R functions to couple axleshaft 30R for direct rotation with drive case 64 while left drive unit 52L is disconnected such that no drive torque is transmitted to left axleshaft 30L.

The eight drive mode is established when second mode clutch 70L and third mode clutch 68R are locked and first mode clutch 68L and fourth mode clutch 70R are released. Thus, right drive unit 52R functions to underdrive right axleshaft 30R while left drive unit 52L drives left axleshaft 30L at the same rotary speed as drive case 64.

The ninth drive mode establishes an "open" differential mode wherein all four of the mode clutches are in their released mode such that no drive torque is transferred from input pinion shaft 58 to either of axleshafts 30L and 30R so as to permit unrestricted relative rotation between rear wheels 32L and 32R with no drive torque delivered thereto.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58. Typically, drive mechanism is initially shifted into its ninth drive mode wherein both drive units 52L and 52R are non-engaged such that no drive torque is transmitted from driven transfer shaft 64 to either of rear wheels 32L and 32R. However, upon detection or anticipation of lost traction at front wheels 20L and 20R, drive units 52L and 52R can be engaged to provide drive torque to rear wheels 32L and 32R based on the tractive needs of the vehicles. For example, the fifth drive mode could be established to overdrive rear wheels 30L, 30R relative to front wheels 20L, 20R when maximum acceleration is required.

In addition to on-off control of the mode clutches to establish the various drive modes associated with direct or underdrive connections through the planetary gearsets, it is further contemplated that variable clutch engagement forces can be generated by the power-operated actuators to adaptively control left-to-right speed and torque characteristics. As such, this adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into one of the specific operative drive mode that is best suited to correct the actual or anticipated oversteer or understeer situation. Optionally, variable control of engagement of the mode clutches permits adaptive regulation of the side-to-side torque and speed characteristics if one of the distinct drive modes is not adequate to accommodate the current steer tractive condition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive axle assembly for use in a motor vehicle having a powertrain and a first and second wheels, comprising:
    an input shaft driven by the powertrain;
    a first axleshaft driving the first wheel;
    a second axleshaft driving the second wheel;
    a drive case driven by said input shaft;
    a first drive unit operably disposed between said drive case and said first axleshaft, said first drive unit including a first planetary gearset and first and second mode clutches, said first planetary gearset including a first ring gear driven by said drive case, a first sun gear, a first carrier driving said first axleshaft, and a set of first planet gears meshed with said first sun gear and said first ring gear and which are rotatably supported from said first carrier, said first mode clutch is operable to selectively brake rotation of said first sun gear and said second mode clutch is operable to selectively couple said first sun gear for rotation with said drive case;
    a second drive unit operably disposed between said drive case and said second axleshaft, said second drive unit including a second planetary gearset and third and fourth mode clutches, said second planetary gearset including a second ring gear driven by said drive case, a second sun gear, a second carrier driving said second axleshaft, and a set of second planet gears meshed with said second sun gear and said second ring gear and which are rotatably supported from said second carrier, said third mode clutch is operable to selectively brake rotation of said second sun gear and said fourth mode clutch is operable to couple said second sun gear for rotation with said drive case; and
    a control system for controlling actuation of said mode clutches.

2. The drive axle assembly of claim 1 wherein a first drive mode is established when said first mode clutch is engaged and each of said second, third and fourth mode clutches are released such that said first axleshaft is underdriven relative to said drive case while said second axleshaft is uncoupled from driven connection with said drive case.

3. The drive axle assembly of claim 2 wherein a second drive mode is established when said third mode clutch is engaged and each of said first, second and fourth mode clutches are released such that said second axleshaft is underdriven relative to said drive case while said first axleshaft is uncoupled from driven connection with said drive case.

4. The drive axle assembly of claim 3 wherein a third drive mode is established when said first and third mode clutches are engaged and said second and fourth mode clutches are released such that both of said first and second axleshafts are underdriven relative to said drive case.

5. The drive axle assembly of claim 1 wherein a first drive mode is established when said second mode clutch is engaged and each of said first, third and fourth mode clutches are released such that said first axleshaft is driven by said drive case while said second axleshaft is uncoupled from driven connection to said drive case.

6. The drive axle assembly of claim 5 wherein a second drive mode is established when said fourth mode clutch is engaged and each of said first, second and third mode clutches are released such that said second axleshaft is driven by said drive case while said first axleshaft is uncoupled from driven connection with said drive case.

7. The drive axle assembly of claim 6 wherein a third drive mode is established when said second and fourth mode clutches are engaged and said first and third mode clutches are released such that both of said first and second axleshafts are directly driven by said drive case to establish a locked four-wheel drive mode.

8. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism for selectively coupling said input shaft to one or both of said first and second axleshafts, said drive mechanism including a drive component driven by said input shaft and first and second drive units operably disposed between said drive component and said first and second axleshafts, said first drive unit including a first planetary gearset and first and second mode clutches, said first planetary gearset including a first ring gear driven by said drive component, a first sun gear, a first carrier driving said first axleshaft, and a set of first planet gears meshed with said first sun gear and said first ring gear and which are rotatably supported from said first carrier, said first mode clutch is operable to selectively brake rotation of said first sun gear and said second mode clutch is operable to selectively couple said first sun gear for rotation with said drive component, said second drive unit including a second planetary gearset and third and fourth mode clutches, said second planetary gearset including a second ring gear driven by said drive component, a second sun gear, a second carrier driving said second axleshaft, and a set of second planet gears meshed with said second sun gear and said second ring gear and which are rotatably supported from said second carrier, said third mode clutch is operable to selectively brake rotation of said second sun gear and said fourth mode clutch is operable to selectively couple said second sun gear for rotation with said drive component; and
a control system for controlling actuation of said mode clutches.

9. The motor vehicle of claim 8 wherein said primary driveline includes a primary differential having an input component driven by said powertrain, and wherein said secondary driveline includes a gear arrangement for causing said input shaft to drive said drive component at a different speed than said input component.

10. The motor vehicle of claim 9 wherein said drive component is overdriven relative to said input component.

11. The motor vehicle of claim 8 wherein said drive mechanism is operable to establish a first underdrive mode when said first mode clutch is engaged and each of said second, third and fourth mode clutches are released such that said first axleshaft is underdriven relative to said drive component and said second axleshaft is uncoupled from driven connection with said drive component.

12. The motor vehicle of claim 11 wherein said drive mechanism is operable to establish a second underdrive mode when said third mode clutch is engaged and each of said first, second and fourth mode clutches are released such that said second axleshaft is underdriven relative to said drive component and said first axleshaft is uncoupled from driven connection with said drive component.

13. The motor vehicle of claim 12 wherein said drive mechanism is operable to establish a third underdrive mode when said first and third mode clutches are engaged and said second and fourth mode clutches are released such that both of said first and second axleshafts are underdriven relative to said drive component.

14. The motor vehicle of claim 1 wherein said drive mechanism is operable to establish a first drive mode when said second mode clutch is engaged and each of said first, third and fourth mode clutches are released such that said first axleshaft is driven at the same rotary speed as said drive component while said second axleshaft is uncoupled from driven connection to said drive component.

15. The motor vehicle of claim 14 wherein said drive mechanism is operable to establish a second drive mode when said fourth mode clutch is engaged and each of said first, second and third mode clutches are released such that said second axleshaft is driven at a common rotary speed with said drive component while said first axleshaft is uncoupled from driven connection with said drive component.

16. The motor vehicle of claim 15 wherein said drive mechanism is operable to establish a third drive mode when said second and fourth mode clutches are engaged and said first and third mode clutches are released such that both of said first and second axleshafts are directly driven by said drive component.

* * * * *